Patented Apr. 29, 1952

2,594,452

UNITED STATES PATENT OFFICE 2,594,452

METHYLOL MELAMINE DERIVATIVES

Milton Kosmin, Dayton, Ohio, assignor to Monsanto Chemical Company, St. Louis, Mo., a corporation of Delaware No Drawing. Application November 24, 1948, Serial No. 61,891

13 Claims. (Cl. 260—67.6)

This invention relates to the preparation of derivatives of methylol melamine, and more particularly to products prepared by the condensation of the various methylol melamines with epoxy compounds.

It is known that epoxides, and particularly ethylene oxide may be condensed with methylol melamines to yield more readily water soluble derivatives, but the derivatives are not particularly useful because of dark red or brown coloration developed during the reaction.

The primary purpose of this invention is to provide a means of preparing colorless condensation products from the same materials. A further purpose of the invention is to provide a means of eliminating the color formation usually encountered in the reaction between methylol melamines and ethylene oxide or substituted ethylene oxide. In application Serial No. 61,892 filed November 24, 1948, by Milton Kosmin, now abandoned, there are described and claimed stabilized methylol melamines and alkyl ethers of methylol melamines, which are capable of being heated and otherwise treated without the usual discoloration. By conducting the condensation of formaldehyde and melamine in the presence of a boron compound, or by adding the boron compound to a previously prepared methylol melamine, the new stable methylol melamines are formed.

It has been found that if the stable methylol melamines containing small proportions of boron compounds are used in the preparation of epoxide condensation products, unusually desirable compositions are formed. Although the new compositions may be identical chemically with those prepared previously, they are quite different in their physical properties, being completely colorless, whereas in the prior art it was believed that such condensation products were dark brown in color.

The new condensation products of epoxides and methylol melamines may be prepared from methylol melamines made in the presence of small proportions of boron compounds, or they may be prepared from any methylol melamine derivative to which a boron compound has been added. Suitable boron compounds which may be used in the practice of this invention are: alkyl borates, such as tributyl borate, boric anhydride, boric acid, salts of boric acid, particularly the alkali and alkaline earth metal borates, boron halides, organic boron complexes, and any other boron compound. The invention is practicable even with very insoluble boron compounds, for example finely divided borosilicate glass. In the practice of this invention any amount of boron may be used, for example 0.001 mole up to 1.0 mole of the boron compound per mole of the methylol melamine may be used, but preferred practice utilizes from 0.01 to 0.5 mole.

In the practice of this invention addition products of the wide variety of methylol melamines may be used, for example methylol melamine, dimethylol melamine, trimethylol melamine, tetramethylol melamine, and higher methylol melamines, the ethers of methylol melamines, containing reactive methylol groups, such as the dimethyl ether of tetramethylol melamine, dibutyl ether of hexamethylol melamine, and the hexadecyl ether of trimethylol melamine, and the corresponding benzyl, cyclohexyl and other ethers of the methylol melamines wherein the alkyl, aralkyl and cycloalkyl groups may have up to twenty carbon atoms. The higher ethers, being water insoluble, are particularly valuable for non-aqueous applications.

The new method may utilize a wide variety of epoxides for example, ethylene oxide, propylene oxide, butylene oxide, butadiene oxide, p-chlorostyrene oxide, styrene oxide, epoxy oleic acid, vinylbiphenyl oxide, epichlorhydrin, glycidic acid, or other compound of the structure:

wherein R and R' are selected from the group consisting of hydrogen, carboxy, or an alkyl radical having up to twenty carbon atoms, vinyl, an aromatic hydrocarbon radical, halogen substituted alkyl having up to twenty carbon atoms, or halogen substituted aromatic radicals.

In the practice of this invention the methylol melamine and the epoxide are mixed in any convenient manner while maintaining the reaction medium basic by means of an alkali metal hydroxide. If the epoxide used is gaseous, for example ethylene oxide, it is desirable to conduct the reaction mass until the desired proportion of the epoxide is absorbed. It has been found desirable to react from one to 30 moles of the epoxide with the methylol melamine. The proportion of epoxide absorbed will depend to some extent upon the number of methylol groups available for reaction on the methylol melamine molecule.

The new colorless compositions so formed are capable of use in any of the conventional applications of methylol melamines. The new compounds when used in water solution are more versatile in that they may be diluted with water to an extent not possible with the methylol melamines, and thereby are more convenient to use in sizing textile fibers and fabrics. The new compositions are also useful as adhesives, especially in laminating cloth and plywood. Other uses of the new compounds will be apparent to one skilled in the art.

Further details of the practice of this invention are set forth with respect to the following specific examples.

Example 1

A solution of 4.5 parts by weight of boric acid in 243 parts of 37 percent formaldehyde solution was prepared and treated with 45 percent potassium hydroxide to a pH of eight. The solution was then mixed with 126 parts by weight of melamine and the mixture vigorously stirred, while heating to a temperature of from 75 to 79° C. for ten minutes. A clear, colorless solution was thereby prepared. The solution was heated to 80° C. and ethylene oxide was introduced while maintaining the temperature between 80 and 85° C. After 246 parts by weight of ethylene oxide had been absorbed the reaction was stopped. The resulting composition was an aqueous solution of the addition product of six moles of ethylene oxide and one mole of trimethylol melamine.

Example 2

Two additional preparations were made by reacting aqueous trimethylol melamine prepared in the presence of boric acid with 13.6 and 20 moles of ethylene oxide per mole of trimethylol melamine. In both of these cases clear, colorless products were obtained, whereas similar compounds prepared from trimethylol melamine not containing boric acid were dark red to black in color. These preparations were made in an alkaline medium similar to that shown in Example 1.

Example 3

Using the procedure described in the first example, except that two moles of formaldehyde were used instead of three, an aqueous solution of dimethylol melamine was prepared. This composition was then condensed with 7.5 moles of ethylene oxide, whereby clear, colorless and more water soluble composition were obtained.

Example 4

A mixture of methylol melamines averaging 1.5 methylol groups per mole of melamine was prepared by using the procedure described in Example 1, except that one-half of the amount of formaldehyde was used. The resulting stable aqueous solution of methylol melamines was condensed with 6.5 moles of ethylene oxide. Clear, colorless aqueous addition products were thereby obtained.

Example 5

A commercially prepared 55 percent aqueous solution of tetramethylol melamine was mixed with one percent by weight of boric acid and then treated with ethylene oxide. A clear, colorless aqueous solution of ethylene oxide addition product was thereby obtained. The reaction mixture was alkaline, similar to Example 1, prior to the treatment by ethylene oxide.

Example 6

A dimethyl ether of tetramethylol melamine was mixed with 0.14 moles of boric acid per mole of the ether and ethylene oxide was introduced for 8.5 hours, 0.58 moles per mole of melamine compound being absorbed. The resulting product was a clear and colorless solution, whereas the control sample prepared from the identical composition to which boric acid had not been added was very dark brown in color. The reaction mixture was alkaline, similar to Example 1, prior to the treatment by ethylene oxide.

Example 7

Using the procedure of Example 1, 63 parts by weight of melamine was mixed with 0.031 parts of boric acid (0.001 moles) and 122 parts of 37 percent formaldehyde solution and heated at 78–80° C. for ten minutes. The clear solution resulting therefrom was treated with ethylene oxide at 80–85° C. for 3.75 hours at which time 71 parts by weight (3.23 moles) had been adsorbed. The product was colorless until over three moles of ethylene oxide had been added and was a pale yellow at the termination of the reaction. Comparable preparations made without boric acid developed color earlier and were amber in color after three moles of ethylene oxide had been added. (See Example 2.)

The invention is defined by the following claims.

1. A method of preparing colorless ethylene oxide adducts which comprises heating a methylol melamine with ethylene oxide in an aqueous alkaline medium in the presence of from 0.001 moles to 1.0 mole of a water soluble boron compound per mole of methylol melamine.

2. A method of preparing colorless ethylene oxide products which comprises heating ethylene oxide with a methylol melamine in an aqueous alkaline medium, said methylol melamine having been prepared in the presence of from 0.001 moles to 1.0 moles of a water soluble boron compound per mole of methylol melamine.

3. A method of preparing colorless ethylene oxide adducts which comprises heating a methylol melamine with from 2 to 30 moles of ethylene oxide in an aqueous alkaline medium in the presence of from 0.001 mole to 1.0 moles of boric acid per mole of methylol melamine.

4. A method of preparing colorless ethylene oxide products which comprises heating from 2 to 30 moles of ethylene oxide with a methylol melamine in an aqueous alkaline medium, said methylol melamine having been prepared in the presence of from 0.001 mole to 1.0 moles of boric acid per mole of methylol melamine.

5. A method of preparing colorless epoxide adducts which comprises heating a melamine compound of the group consisting of the methylol melamines and the partial alkyl ethers of methylol melamines containing reactive methylol groups, said alkyl group containing up to twenty carbon atoms; with an epoxide having the structural formula

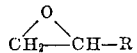

wherein R is a radical of the group consisting of hydrogen, carboxyl, vinyl, an alkyl radical having up to twenty carbon atoms, an aromatic hydrocarbon radical, halogen substituted alkyl radicals having up to twenty carbon atoms, halogen substituted aromatic radicals, carboxy substituted alkyl radicals having up to twenty carbon atoms, and carboxy substituted aromatic radicals; in an alkaline medium and in the presence of from 0.001 to 1.0 mole per mole of said methylol melamine compound of a substantially colorless water-soluble boron compound.

6. A method of preparing colorless epoxide adducts which comprises heating an epoxide having the structural formula

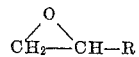

wherein R is a radical of the group consisting of hydrogen, carboxyl, vinyl, an alkyl radical having up to twenty carbon atoms, an aromatic hydrocarbon radical, halogen substituted alkyl radicals having up to twenty carbon atoms, halogen substituted aromatic radicals, carboxy substituted alkyl radicals having up to twenty carbon atoms, and carboxy substituted aromatic radicals; in an alkaline medium, with a melamine compound of the group consisting of the methylol melamines and the partial alkyl ethers of the methylol melamines containing reactive methylol groups, said alkyl groups having up to twenty carbon atoms and the melamine compound having been prepared in the presence of from 0.001 to 1.0 mole per mole of said methylol melamine compound of a substantially colorless water-soluble boron compound.

7. A method of preparing colorless ethylene oxide adducts which comprises heating a methyol melamine with from 2 to 30 moles of ethylene oxide in an aqueous alkaline medium in the presence of from 0.001 to 1.0 mole of an alkali metal borate, all per mole of methylol melamine.

8. A method of preparing colorless ethylene oxide products which comprises heating from 2 to 30 moles of ethylene oxide with a methylol melamine in an aqueous alkaline medium, said methylol melamine having been prepared in the presence of from 0.001 to 1.0 mole of an alkali metal borate, all per mole of methylol melamine.

9. A method of preparing colorless ethylene oxide adducts which comprises heating a methylol melamine compound with from 2 to 30 moles of ethylene oxide in an aqueous alkaline medium in the presence of from 0.01 to 0.5 mole of a substantially colorless water-soluble boron compound, all per mole of said methylol melamine compound.

10. A method of preparing colorless ethylene oxide adducts which comprises heating a methylol melamine compound with from 2 to 30 moles of ethylene oxide in an aqueous alkaline medium in the presence of from 0.01 to 0.5 mole of an alkali metal borate, all per mole of said methylol melamine compound.

11. A method of preparing colorless alkylene oxide adducts which comprises heating a melamine compound of the group consisting of the methylol melamines and the partial alkyl ethers of methylol melamines containing reactive methylol groups, said alkyl group containing up to twenty carbon atoms; with an alkylene oxide, wherein the epoxy group is joined to contiguous carbon atoms; in an alkaline medium and in the presence of from 0.001 to 1.0 mole per mole of said methylol melamine compound of a substantially colorless water-soluble boron compound.

12. A method of preparing colorless alkylene oxide adducts which comprises heating an alkylene oxide, wherein the epoxy group is joined to contiguous carbon atoms, in an alkaline medium, with a melamine compound of the group consisting of the methylol melamines and the partial alkyl ethers of the methylol melamines containing reactive methylol groups, said alkyl group having up to twenty carbon atoms and the melamine compound having been prepared in the presence of from 0.001 to 1.0 mole per mole of said methylol melamine compound of a substantially colorless water-soluble boron compound.

13. A method of preparing colorless alkylene oxide adducts which comprises heating a melamine compound of the group consisting of the methylol melamines and the partial alkyl ethers of methylol melamines containing reactive methylol groups, said alkyl group containing up to twenty carbon atoms; with an alkylene oxide, wherein the epoxy group is joined to contiguous carbon atoms; in an alkaline medium having dispersed therein from 0.001 to 1.0 mole, per mole of said methylol melamine compound, of a substantially colorless boron compound.

MILTON KOSMIN.

REFERENCES CITED

The following references are of record in the file of this patent:

UNITED STATES PATENTS

| Number | Name | Date |
|---|---|---|
| 2,368,451 | D'Alelio | Jan. 30, 1945 |
| 2,399,489 | Landes | Apr. 30, 1946 |
| 2,467,160 | Scot | Apr. 12, 1949 |

FOREIGN PATENTS

| Number | Country | Date |
|---|---|---|
| 879,551 | France | Nov. 30, 1942 |
| 230,185 | Switzerland | Mar. 1, 1944 |